F. GUTTERIDGE.
MULTIPLE MOLD FOR TILE MAKING MACHINES.
APPLICATION FILED MAY 15, 1916.
1,215,797.
Patented Feb. 13, 1917.
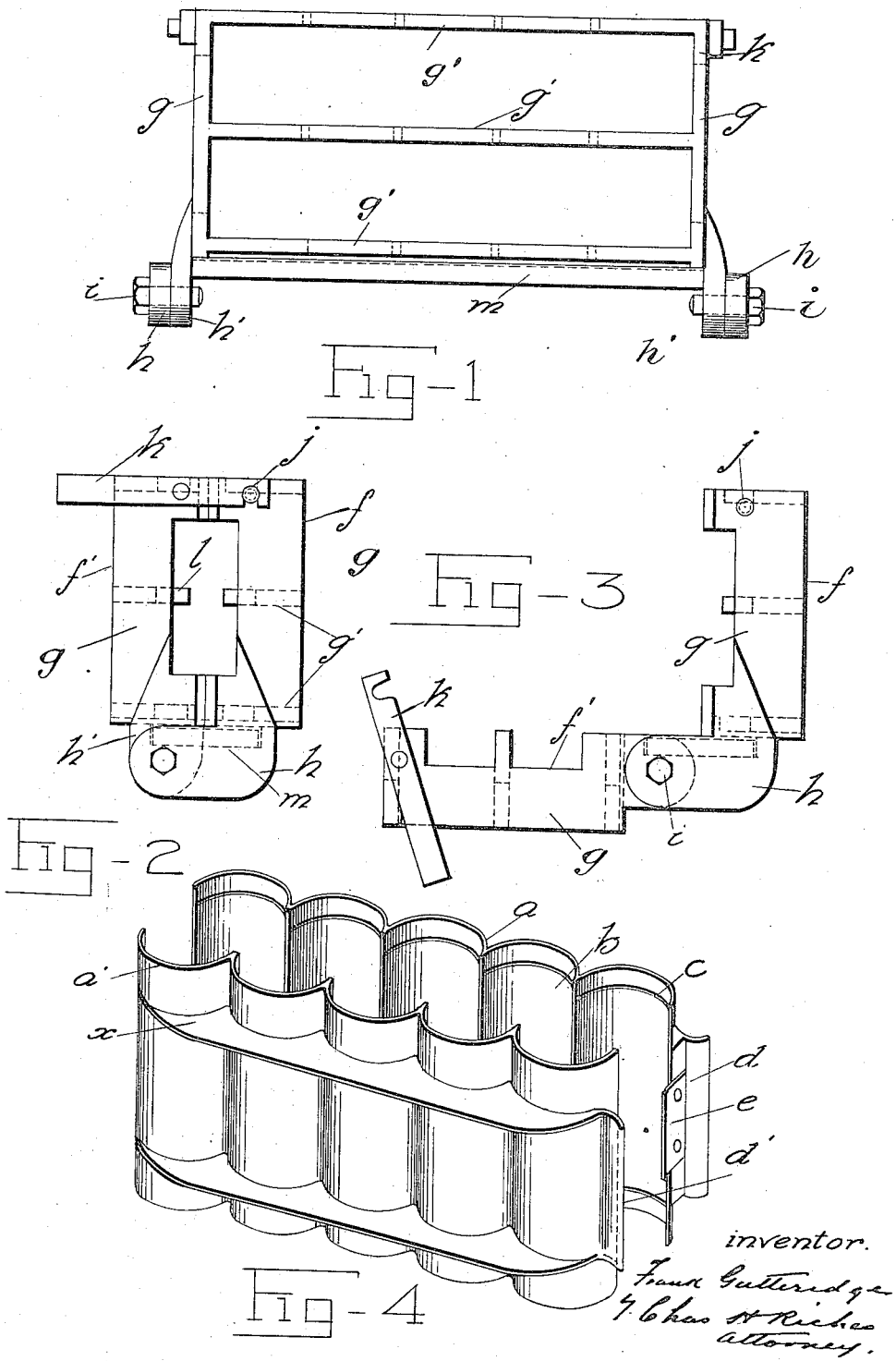

F. GUTTERIDGE.
MULTIPLE MOLD FOR TILE MAKING MACHINES.
APPLICATION FILED MAY 15, 1916.

1,215,797.

Patented Feb. 13, 1917.
2 SHEETS—SHEET 2.

inventor.
Frank Gutteridge
by Chas H Riches
attorney.

UNITED STATES PATENT OFFICE.

FRANK GUTTERIDGE, OF SARNIA, ONTARIO, CANADA.

MULTIPLE MOLD FOR TILE-MAKING MACHINES.

1,215,797. Specification of Letters Patent. Patented Feb. 13, 1917.

Application filed May 15, 1916. Serial No. 97,684.

*To all whom it may concern:*

Be it known that I, FRANK GUTTERIDGE, of the city of Sarnia, in the county of Lambton and Province of Ontario, Dominion of Canada, have invented certain new and useful Improvements in Multiple Molds for Tile-Making Machines; and I hereby declare that the following is a full, clear, and exact description of the same.

This invention relates to a mold, by which a number of tubular tiles can be simultaneously formed and conveniently carried from the molding apparatus, and it consists essentially of two corresponding sets of semi-cylindrically-shaped matrices with a handle bar or hand grip at each side of each set for the manipulation of the mold, and guide plates at the sides of one set to overlap the sides of the other set and correctly position the corresponding matrices of each set with respect to each other.

The mold is placed in a mold box consisting of two separable parts, each having arc-shaped seats for the two sets of the semi-cylindrically-shaped matrices, and a pallet forming the bottom of the mold, apertured in alinement with the cavities of the matrices which, in the case of side opening molds, can be utilized as a tray for the molded articles as they are carried from the molding apparatus, one set of the matrices, in the case of a horizontally opening mold, being employed as a tray to carry the tiles, as hereinafter set forth and particularly pointed out in the claims.

In the drawings:

Figure 1. is a front elevation of the preferred mold, with the parts in their closed position;

Fig. 2, is an end elevation of the mold shown in Fig. 1;

Fig. 3, is an end elevation of the mold shown in Fig. 2, with the parts in their open position;

Fig. 4, is a perspective view of the matrix with the parts separated;

Like characters of reference refer to like parts throughout the specification and drawings.

Figure 5:
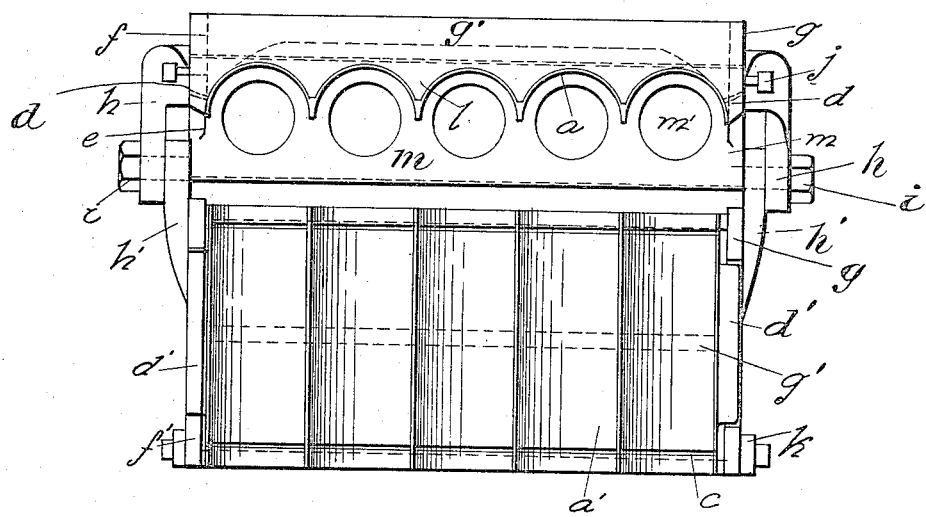
Fig. 5, is a plan view of the mold shown in the preceding figures, with the parts in the position shown in Fig. 3; and, Fig. 6, is a perspective view of a modification of the mold shown in the preceding figures.

In the mold shown in Figs. 1 to 5 are employed two corresponding members $a$, $a'$, each consisting of a set of semi-cylindrical matrices $b$. As shown in the drawings, there are five semi-cylindrical matrices in each set, but the number of matrices may be varied to correspond with the coöperating parts of the machine in which the mold is to be used.

These mold members $a$, $a'$ are preferably made of cast metal, aluminum or aluminum alloys being the most satisfactory, as this metal is not liable to the same degree of corrosion as iron or steel, resulting from the chemical action of the materials.

The mold members $a$, $a'$, are so formed that the semi-cylindrical matrices $b$, of one set correspond in every particular with those of the other set, so that when the two members are assembled, the edges of the wall of each matrix cavity of the one set will abut against the edges of the wall of the corresponding matrix cavity of the other set, and form a tubular or cylindrical matrix to mold the outer surface of the composition placed therein.

In the interior surface of the wall of each semi-cylindrical matrix, are semi-annular channels $c$, the arcs of which are concentric with the matrix cavity to produce circumferential ribs on the molded material. Each of the mold members $a$, $a'$ is provided with handle bars $d$, $d'$ preferably parallel with the adjacent edges of the mold cavities at the extremities of the members and conveniently positioned to permit of each adjacent pair of handle bars $d$, $d'$ being grasped by the operator to hold the mold members together when manipulating the mold.

The mold member $a$ is provided with guide plates $e$ overhanging its edges to engage the corresponding edges of the mold member $a'$ and guide it correctly into position with relation to the mold member $a$, so that the edges of the walls of all the matrices of both members will be correctly positioned.

As shown in Fig. 4, the inner and outer walls of each of the matrices are arc-shaped, and these walls are connected together and braced by ribs $x$ extending lengthwise of the mold to resist the torsional strains imposed on the matrices during the formation of the tile and the carriage of the same from the machine.

The mold, during the forming of the tile, is placed in a mold box consisting of two parts $f$, $f'$. Each of the parts $f$, $f'$ shown in the drawings consists of two side bars $g$ and three cross bars $g'$ connecting the side bars together, with open spaces between the cross bars and side bars to minimize the weight of the parts. At the lower ends of the side bars $g$ of the box part $f$ are hinge members or lugs $h$ extending horizontally in the direction of the box part $f'$ and at the lower ends of the side bars $g$ of the box part $f'$ are hinge members or lugs $h'$ extending downwardly into contact with the hinge members or lugs $h$. Connecting each adjacent pair of hinge members or lugs $h'$ is a hinge pin or bolt $i$ to couple the box parts $f$, $f'$ together and to permit of the box part $f'$ moving between a vertical and a substantially-horizontal position, respectively, into closed or open relation with the box part $f$.

Projecting from the top of each of the side bars $g$ of the box part $f$ are stationary bolts or pins $j$ engaged by latch bars $k$ pivotally connected to the top of the side bars of the box part $f'$.

The inner face of each of the cross bars $g'$ is formed with a set of arc-shaped seats $l$ for the semi-cylindrical matrices of its respective mold member, the arc-shaped seats $l$ in the three cross bars of each box part being vertically alined to provide a row of seats for each matrix of its respective mold member, and each row of seats in the cross bars of the box part $f$ being horizontally alined with those of the box part $f'$ to maintain the assembled formation of the mold members when the box parts are in their closed position.

At the bottom of the mold box is a pallet $m$ having a set of apertures $m'$ alined with the rows of seats $l$, the apertures $m'$ being of corresponding diameter to the core to provide a bottom for the matrices to mold the bottom of the tile, the apertures being formed to permit of the clearance of the droppings from the material within the molds, and for the movement of the cores through the pallet.

The mold box shown in Figs. 1 to 5 inclusive, may be described as a horizontally opening mold, as in this figure, the mold part $f$ is relatively stationary, and the mold part $f'$ swings from the vertical position it occupies during the molding operation, to a substantially-horizontal position when the molding operation is completed, for the removal of the molded articles.

Figure 6:
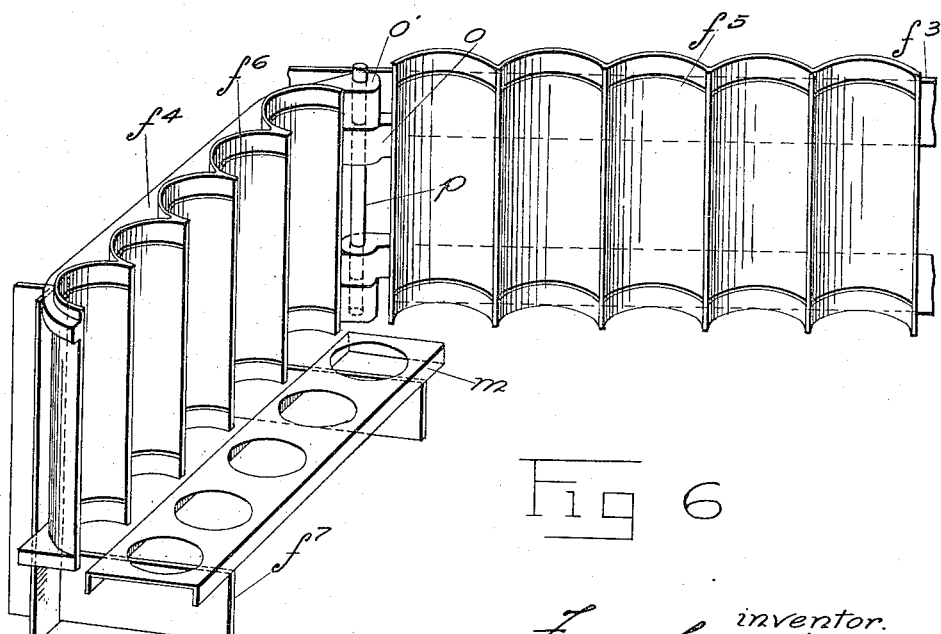

In Fig. 6, the mold may be said to be a vertically-opening mold, as in this case, the top and bottom of one of the side bars of the box part $f^3$ are formed with hinge members $o$, and the top and bottom of the side bar of the box part $f^4$ are formed with hinge members $o'$, the hinge members being connected by hinge bolts or pins $p$ to permit of the box part $f^4$ swinging in a vertical plane between its open and closed positions. In the construction shown in these figures, the matrices $f^5$, $f^6$ are integral with the mold box parts $f^3$, $f^4$ respectively, and when the mold box part $f^4$ is opened, it carries the molded tile with it on the pallet, which is, in this case, removably supported on the arms $f^7$ of the mold box part $f^4$.

In molding the tile, in the construction shown in Figs. 1, 2, 3 and 4, the movable box part $f'$ is turned to an open position. The mold members $a$, $a'$ are then assembled with the semi-cylindrical matrices $b$ of the member $a$ alined with the semi-cylindrical matrices of the member $a'$, and the edges of the walls of these members in contact.

The mold is then placed in the mold box with the bottom of the members $a$, $a'$ resting upon the pallet $m$ and the semi-cylindrical matrices of one of the mold members resting in their respective seats $l$ in the box part $f$. The box part $f'$ is then moved to a closed position and the latch bars $k$ are engaged with the latch bolts or pins $j$, bringing the seats $l$ of the box part $f'$ into contact with the matrices of the other mold member and locking the two mold members in their assembled relation.

The cores are inserted in the matrix cavities and the material is introduced between the walls of the matrices and the cores. When the molding operation is completed, the box part $f'$ is turned to an open position, and the molded articles are removed.

As shown in Figs. 3 and 5, the box part $f'$ lowers to a substantially-horizontal position, and the mold and its contents are lowered with it. When the mold is in its lowered position, the mold members are employed as a tray to carry the molded articles away from the molding apparatus.

In the construction shown in Fig. 6, the mold part $f^4$ is swung in a vertical plane to an open position, the pallet then serving as a support for the molded articles; and the pallet with these articles on it is carried away from the molding apparatus.

To facilitate the formation of the seats $l$, the box parts are cast with arc-shaped cavities, and these cavities are then lined with soft metal, such as babbitt or the like, which is afterward accurately shaped to fit the exterior walls of the matrices.

By forming the mold box of the side bars $g$ and cross bars $g'$ with open spaces between the cross bars and side bars, it is possible for the droppings from the material upon the parts of the mold box to fall through these openings and keep the mold box free of concrete, without attention on the part of the operator.

Having thus fully described the nature of my invention, what I claim as new and desire to secure by Letters Patent, is:—

1. A mold consisting of two corresponding separable members, each containing a set of semi-cylindrically-shaped matrices, the matrices of one member registering with those of the other member, and a handle bar at each end of each of said members, in combination with a mold box consisting of two separable parts to contain the mold members, and a pallet for the mold box forming a bottom for the mold.

2. A mold consisting of two corresponding separable members, each containing a set of semi-cylindrically-shaped matrices, the matrices of one member registering with those of the other member, in combination with a mold box consisting of two separable parts to contain the mold members, each part of the mold box having arc-shaped seats for the semi-cylindrically-shaped matrices, and a pallet in the mold box forming a bottom for the mold.

3. A mold comprising a matrix consisting of two corresponding separable members, each containing a set of semi-cylindrically-shaped matrices, the matrices of one member registering with those of the other member, a mold box consisting of two separable parts to contain the mold members therein, and a pallet in the mold box forming a bottom for the matrix.

4. A mold consisting of two corresponding and separable members, each of said members formed with a set of semi-cylindrically-shaped cavities having grooves therein concentric with the cavities, in combination with a mold box consisting of two separable parts to contain the mold members therein, and a pallet in the mold box forming a bottom for the mold.

5. A mold consisting of two corresponding and separable members, each of said members formed with a set of semi-cylindrically-shaped cavities having grooves therein concentric with the cavities, and a handle bar at each end of each of said mold members, in combination with a mold box consisting of two separable parts to contain the matrix, and a pallet in the mold box forming a bottom for the mold.

6. A mold consisting of two corresponding and separable members, each of said members formed with a set of semi-cylindrically-shaped cavities having grooves therein concentric with the cavities, and guide plaes at the sides of one of said members to overlap the sides of the other member, in combination with a mold box consisting of two separable parts to contain the matrix, and a pallet in the mold box forming a bottom for the mold.

7. A mold consisting of two corresponding and separable members, each of said members formed with a set of semi-cylindrically-shaped cavities having grooves therein concentric with the cavities, in combination with a mold box comprising two mold box parts hinged to move between an open and closed position, each of said parts having arc-shaped seats on its interior face to receive the mold members, and a pallet in the mold box forming a bottom for the mold.

8. A mold consisting of two corresponding and separable members, each of said members formed with a set of semi-cylindrically-shaped cavities having grooves therein concentric with the cavities, and a handle bar at each end of each of said members, in combination with a mold box comprising two mold box parts hinged to move between an open and closed position, each of said parts having arc-shaped seats on its interior face to receive the mold members, and a pallet in the mold box forming a bottom for the mold.

9. A mold consisting of two corresponding separable members, each containing a set of semi-cylindrically-shaped matrices, the matrices of one member registering with those of the other member, in combination with a mold box comprising two separable members, each consisting of side bars and cross bars connecting them, the cross bars having arc-shaped seats in their inner faces to receive the semi-cylindrically-shaped matrices of each of the mold members.

Toronto, April 19th, 1916.

FRANK GUTTERIDGE.

Signed in the presence of—
C. H. RICHES,
EDWARD BERNSTEIN.

Copies of this patent may be obtained for five cents each, by addressing the "Commissioner of Patents, Washington, D. C."